(12) United States Patent
Havemose

(10) Patent No.: US 7,395,539 B1
(45) Date of Patent: Jul. 1, 2008

(54) TRANSACTION CONTROL IN AN INFORMATION APPLIANCE MANAGEMENT SYSTEM

(75) Inventor: Allan Havemose, San Jose, CA (US)

(73) Assignee: Gateway Inc., Irvine, CA (US)

(*) Notice: Subject to any disclaimer, the term of this patent is extended or adjusted under 35 U.S.C. 154(b) by 0 days.

(21) Appl. No.: 09/542,743

(22) Filed: Apr. 4, 2000

Related U.S. Application Data

(60) Provisional application No. 60/127,767, filed on Apr. 5, 1999.

(51) Int. Cl.
*G06F 3/00* (2006.01)
*G06F 15/16* (2006.01)

(52) U.S. Cl. .................. 719/310; 709/201

(58) Field of Classification Search ............ 709/315, 709/201; 719/310, 315
See application file for complete search history.

(56) References Cited

U.S. PATENT DOCUMENTS

| | | | | |
|---|---|---|---|---|
| 5,481,721 A | * | 1/1996 | Serlet et al. | 719/315 |
| 5,590,334 A | * | 12/1996 | Saulpaugh et al. | 719/315 |
| 5,768,505 A | * | 6/1998 | Gilchrist et al. | 709/201 |
| 6,070,197 A | * | 5/2000 | Cobb et al. | 719/315 |
| 6,101,527 A | * | 8/2000 | Lejeune et al. | 709/201 |
| 6,138,169 A | * | 10/2000 | Freund et al. | 719/313 |
| 6,237,018 B1 | * | 5/2001 | Chessell | 718/101 |
| 6,345,316 B1 | * | 2/2002 | Chessell et al. | 719/330 |
| 6,473,740 B2 | * | 10/2002 | Cockrill et al. | 705/27 |
| 6,920,636 B1 | * | 7/2005 | Dievendorff et al. | 719/315 |

FOREIGN PATENT DOCUMENTS

JP 407203163 A * 8/1995

OTHER PUBLICATIONS

Paul Dreyfus, Corba: Theory and Practice, 1998.*

* cited by examiner

*Primary Examiner*—William Thomson
*Assistant Examiner*—LeChi Troung
(74) *Attorney, Agent, or Firm*—Scott Charles Richardson; The Brevetto Law Group, PLLC

(57) ABSTRACT

The present invention provides a universal information appliance management system capable of executing transactions, including financial transactions, across a distributed network. The present invention allows content/service providers to control distribution of the content or services they furnish, and provides novel business process features such as automatic micro-billing of events and instances wherein minuscule requests and tasks of very low value may be billed and monies collected where doing so was otherwise impractical. The information appliance management system also provides dynamic support for multiple simultaneous payment algorithms and for easily modifying or updating the payment algorithms as desired. Further, the present invention provides for automatic offline or online transactions with deferred connections such that payment for a transaction may be secured prior to actually completing the transaction such that the user may obtain the paid for content even without an immediate network connection. Additionally, the present invention provides central authentication of objects of the system such that one object may verify the validity of any other object.

20 Claims, 14 Drawing Sheets

TRANSACTION CONTROL IN AN INFORMATION APPLIANCE MANAGEMENT SYSTEM

CROSS REFERENCE TO RELATED APPLICATIONS

The present application claims the benefit under 35 U.S.C. § 119(e) of U.S. Provisional Patent Application Ser. No. 60/127,767 filed on Apr. 5, 1999. Said U.S. Provisional Application 60/127,767 is herein incorporated by reference in its entirety. The present invention incorporates U.S. Pat. No. 6,757,903, issued on Jun. 29, 2004, titled "Object driven software architecture method and apparatus" and U.S. Pat. No. 6,842,894, issued on Jan. 11, 2005, titled "Dynamic Compiling" by reference in their entirety. The present application also incorporates the following applications by reference in their entirety:

| Filing Date | Ser. No. |
| --- | --- |
| Apr. 4, 2000 | 10/806,890 |
| Apr. 4, 2000 | 09/542,716 |
| Apr. 4, 2000 | 09/542,159 |

FIELD OF THE INVENTION

The present invention relates generally to the fields of transaction control, and more specifically to methods and apparatus for implementing business process features over a network of digital information appliances, networked computers/devices, and conventional computers.

BACKGROUND OF THE INVENTION

Methods and apparatus for transacting business over a network are old in the art. For example, telephone communications have long been utilized to transact purchases and transfer funds between accounts. Likewise, current cable and satellite television systems allow viewers to order video and audio content paid for via a viewer's credit or debit account information. Additionally, "on-line" purchases of goods and services are becoming common over the INTERNET. However, such methods and apparatus do not allow a buyer and a seller to transact business utilizing a common or universal transaction system.

Digital information appliances (DIA) include electronic devices designed to perform a specific function or group of functions more efficiently than would a conventional computer system. Like computer systems, information appliances may be interconnected with a network such as the INTERNET to provide content and functions which would not be available when the appliances operated independently. Preferably, such network connections are transparent to the user so that the complexity of the underlying computer network is masked. In this manner, information appliances provide advantages in simplicity of operation and computing ease of use to their users.

As the proliferation of digital information appliances accelerates, it will become necessary to develop a standard system architecture and operating environment to facilitate their use and interconnection with each other and other networked devices. Such a system architecture may utilize a distributed object model employing object oriented programming methods. Object oriented programming is a programming paradigm (method) wherein a program is organized as a collection of discrete objects that are self-contained collections of data structures and routines that interact with that data. Such objects encapsulate related data and procedures so as to hide that information by allowing access to the data and procedures only through the object's published interface. Hence changes to the data and or procedures of the object are isolated from other objects. This provides an architecture that is more easily maintained since changes to an object's code does not affect other objects.

Likewise, object oriented programming methods provide for inheritance of an object's characteristics into another class of object. Thus, an object may be derived from a first object to form a second object which "inherits" certain properties of its parent object. This allows for both (1) the formation of subclasses of objects having more specialized features and/or capabilities, and (2) the reuse of individual objects in different programs. Thus, libraries of proven objects may be developed which may be used repeatedly in different applications.

In developing a standard appliance system architecture, it is desirable to allow access to objects in a transparent fashion so that objects created in different programming languages and objects residing on different appliances, network servers, or computer systems that are networked together are accessible to the user without extensive modification of the user's programming code. For computer networks, this capability may be provided by object oriented distributed environments such as the common object request broker architecture (CORBA). Such system architectures are based upon a client-server model, in which object servers provide public interfaces to object-clients that make requests of the object servers. Typically in such systems, the servers are objects consisting of data and associated methods. The object clients obtain access to the object servers by sending them messages which are mediated by the distributed system. When the server object receives the message it invokes the appropriate method and transmits the result back to the object client. The object-client and object server communicate through an Object Request Broker (ORB) which is used to locate the various distributed objects and establish communication between the objects and the client. However, such existing distributed object architectures require that all transactions (communications between client objects and server objects) must pass through an ORB. As a result, the ORB becomes a single failure point which could potentially disable such a system. Further, an ORB typically requires a large amount of memory. Thus, architectures such as CORBA would be unsuitable for "thin" (simple) appliances which have a limited amount of memory.

Consequently, it would be advantageous to develop an information appliance management system employing a standard appliance system architecture. Such an information appliance management system would provide greater fault tolerance than conventional object based architectures, and may be implemented on thin appliances having a limited amount of memory. The information appliance management system would allow management of transactions performed through information appliances.

Additionally, unlike prior art transaction control systems, it would be advantageous if such transaction management would allow content/service providers to control distribution of the content or services they provide and would include novel features such as micro-billing of events and instances, dynamic support for multiple simultaneous payment algorithms, and automatic offline/online transactions with deferred connections.

SUMMARY OF THE INVENTION

The present invention provides a universal information appliance management system capable of executing transactions, including financial transactions, across a distributed network. The appliance management system allows content/service providers to control distribution of the content or services they furnish, and provides novel business process features such as automatic micro-billing of events and instances wherein minuscule requests and tasks of very low value may be billed and monies collected where doing so was otherwise impractical. The information appliance management system also provides dynamic support for multiple simultaneous payment algorithms and for easily modifying or updating the payment algorithms as desired. Further, the present invention provides for automatic offline or online transactions with deferred connections such that payment for a transaction may be secured prior to actually completing the transaction such that the user may obtain the paid for content even without an immediate network connection.

To accomplish these objectives, the present invention provides a method for executing a transaction control task in an information appliance network, in for example, a distributed object information handling system environment. In one embodiment, the method includes steps for calling an object to execute a task requested by an application by transferring the request to an interface object, locating an implementation object for executing the task, upon locating the implementation object, creating an instance of the implementation object and then passing the request from the interface object to the implementation object, executing the task with the implementation object whereby a result of the task is produced, passing the result from the implementation object to the interface object, and passing the result to the application.

To further accomplish the above listed objects, the present invention provides a distributed object information handling system. In one embodiment, the information handling system includes an interface object for interfacing with an application, a message bus for passing information between the interface object and an implementation object, and an architecture administrator for locating the implementation object wherein the architecture administrator creates an instance of the implementation object upon locating the implementation object such that the implementation object executes a task requested by the application and passes a result of the task to the application via the interface object.

In further accomplishment of the above listed objects, the present invention provides a system for implementing a transaction in a distributed object information handling system. In one embodiment, the system includes means for transmitting a request that requires a transaction, the transmitting means including an interface object for interfacing with an application generating the request, means for authorizing the transaction, the authorizing means including a first implementation object for receiving the request, authorizing the transaction, and for transmitting authorization of the transaction, and means for executing the task, the executing means including a second implementation object for receiving authorization of the transaction and for transmitting a result of the task to the transmitting means.

To additionally accomplish the above listed objects, the invention provides a method for billing a transaction on a distributed object system. In one embodiment, the method includes steps for receiving a command to perform a task, determining whether the task has been paid for by querying a counter object, in the event the task has been paid for, incrementing the counter object, and performing the task.

It is to be understood that both the forgoing general description and the following detailed description are exemplary and explanatory only and are not restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

The present invention includes a system architecture and operating environment for digital information appliances (DIAs) which allows for feature and feature enhancements for digital information appliances and the like. A DIA includes electronic devices capable of operating on a computer network in batch or real-time. Most DIA's include an I/O, a ROM, and a memory. DIAs include both single feature and multiple feature devices. In a preferred embodiment, DIAs operate in the network of the present environment with general purpose computers and the like (FIG. 1).

Figure 1:
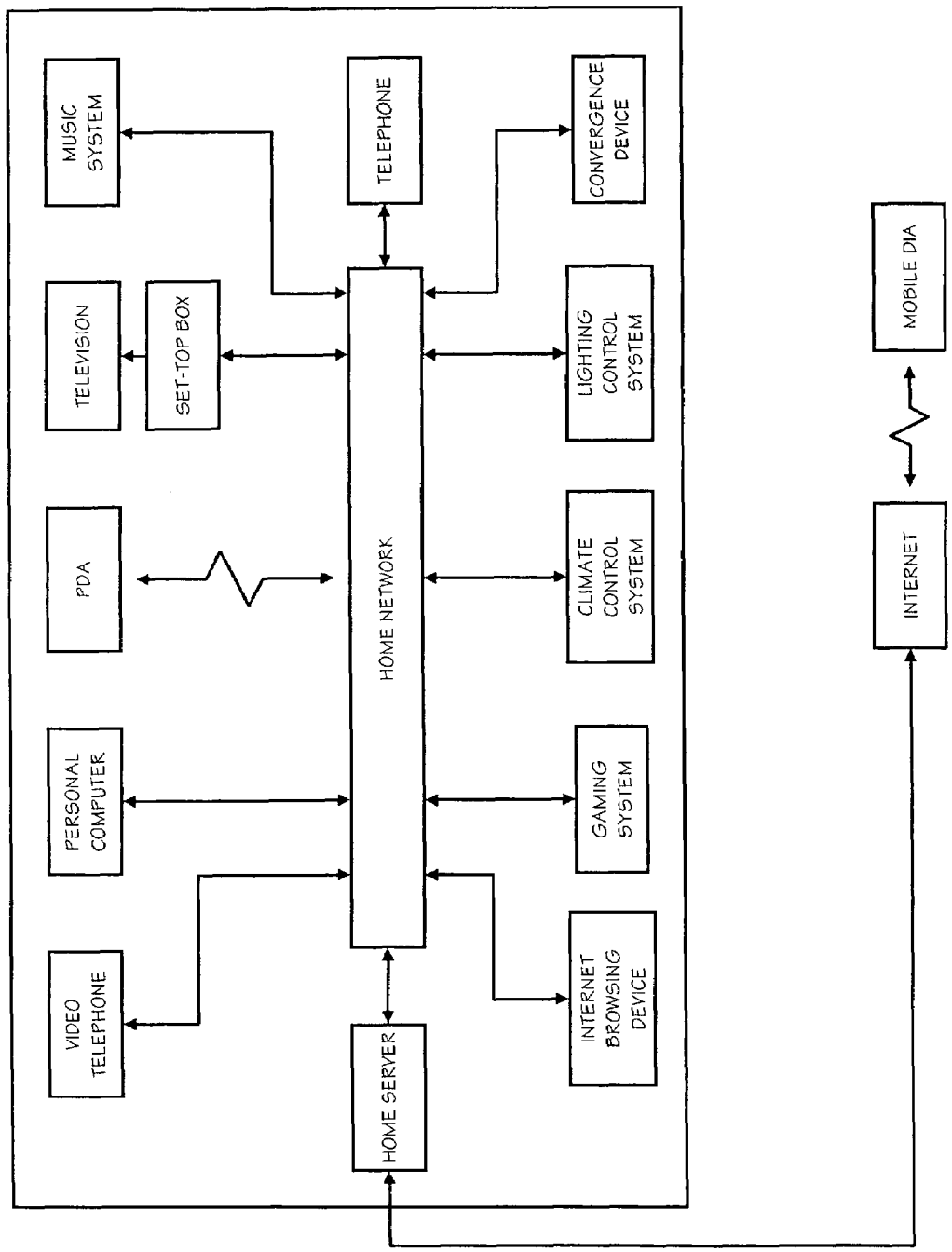
FIG. 1 is a block diagram illustrating a network of information appliances having a local and a global portion operated at least partially by the architecture of the present invention.

Referring generally now to FIGS. 1 through 10, a system architecture and operating environment for digital information appliances (DIAs) which allows for feature and feature enhancements for digital information appliances and the like is shown. A DIA is any electronic device capable of operating on a computer network in batch or real-time. Most DIA's include an I/O, a ROM, and a memory. DIAs include both single feature and multiple feature devices, such as information handling systems. In a preferred embodiment, DIAs operate in the network of the present environment with general purpose computers and the like (FIG. 1).

System Architecture and Operating Environment

To best understand the many novel and innovative features of the universal information appliance management system of the present invention, a discussion of an exemplary underlying system architecture and operating environment is in order. While the patentable features of the present system architecture and operating environment (as claimed herein) will be apparent, other object based or procedural architectures may be utilized to implement the information appliance management system of the present invention.

An object based implementation is described in the preferred embodiment, however those skilled in the art will recognize that the architecture, including a functional hierarchy and an administration function, could be implemented in a procedural implementation without departing from the spirit of the invention.

Figure 2:
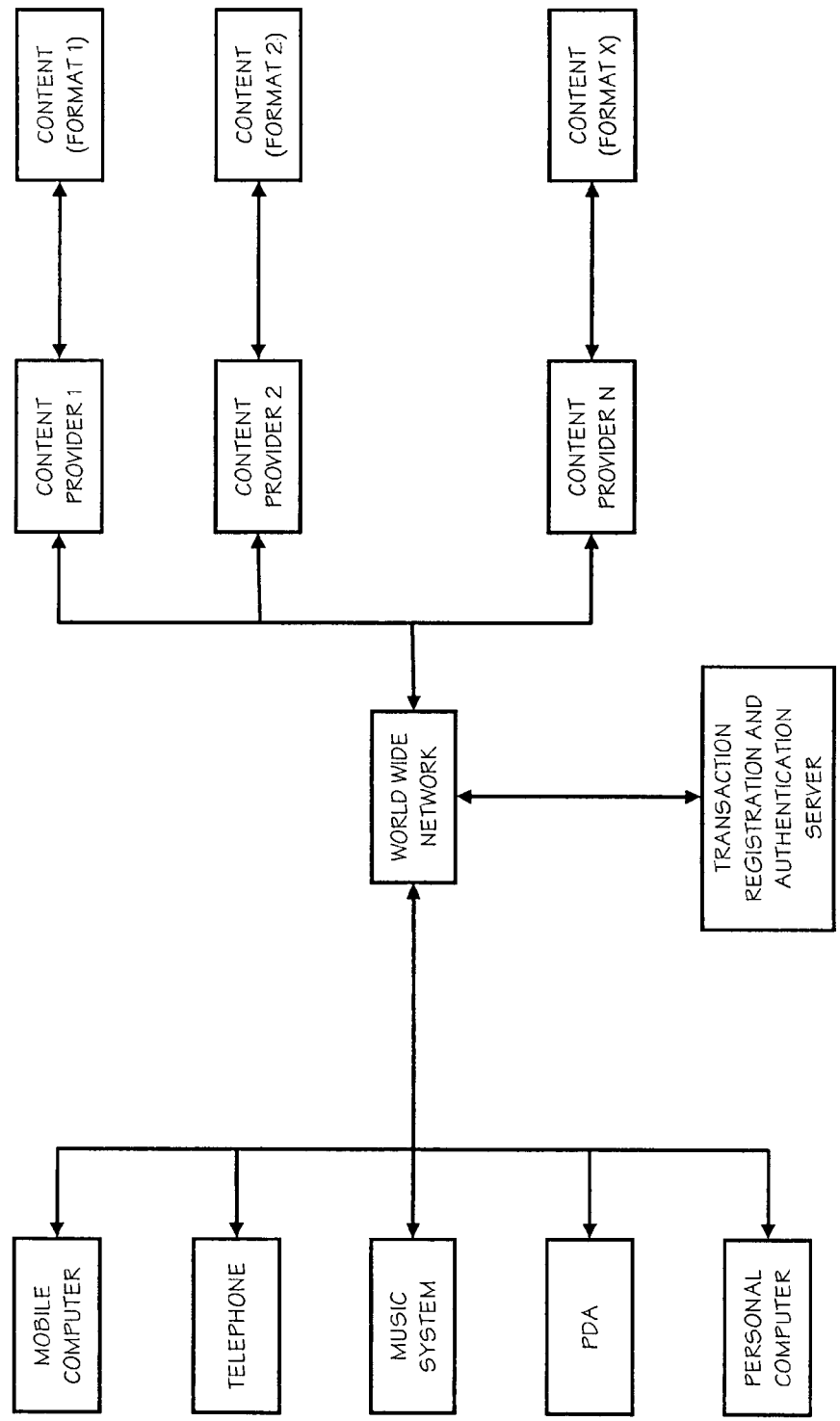
FIG. 2 is a block diagram illustrating content exchange between computers and information appliances over a network at least partially operated by the architecture of the present invention.

The system architecture and operating environment of the present invention (herein after "the architecture") includes an object hierarchy and object administrator. Together the object hierarchy and object administrator provide additional services not offered by the underlying operating system. The architecture of the present invention creates a scalable, object driven software architecture that supports both simple appliances, network computers/devices and general purpose computers such as personal computers, servers, "mainframe" computers, and "super" computers (FIG. 2).

The architecture of the present invention supports the creation of compelling and easy-to-use consumer and desktop user-interfaces. Additionally, networking within the architecture of the present invention is pervasive, i.e., resources on the network behave as local resources and execution is transportable across network boundaries.

Dynamic Base-Objects

The architecture of the present invention also enables efficient development of applications; whether work processors (e.g., word processors), video applications, games or soft appliances. The architecture of the present invention includes dynamic base-objects (DBO). Each DBO implements a defined behavior, but may in addition request and use capabilities of another DBO. DBOs may also provide services to another object such as a DBO requesting another DBO.

Figure 3:
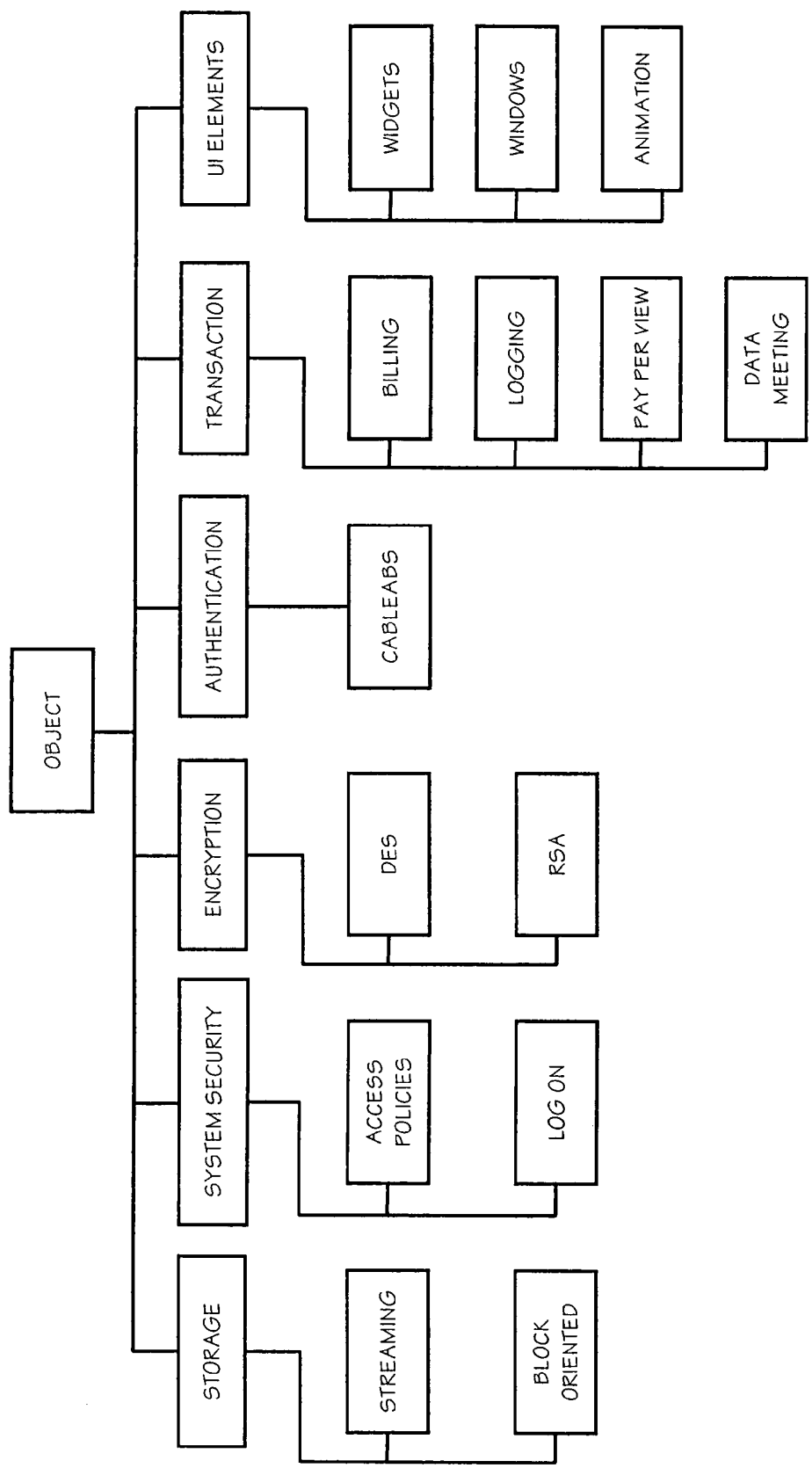
FIG. 3 is a block diagram illustrating the hierarchy of the dynamic objects which operate within the architecture of the scalable, distributed network of the present invention.

In a presently preferred embodiment of the invention a DBO may provide service routines to manage identification and communication with other DBOs. The architecture of the present invention also provides a DBO hierarchy, wherein each DBO or class within the hierarchy specializes in providing one particular type of service. A presently preferred exemplary embodiment of this hierarchy is illustrated in FIG. 3. The hierarchy of the present invention allows for features and capabilities not found in prior art object oriented programming.

Figure 4:
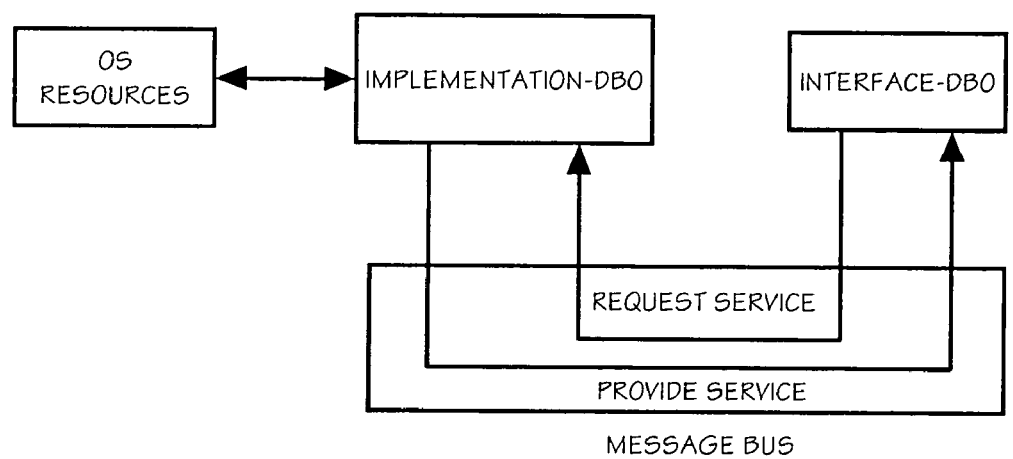
FIG. 4 is a block diagram illustrating the relationship between both implementation-dynamic-base-objects (hereinafter "implementation-DBO") and interface-dynamic-base-objects (hereinafter "interface-DBO") operating within the language neutral architecture of the scalable, distributed network of the present invention.
Figure 5:
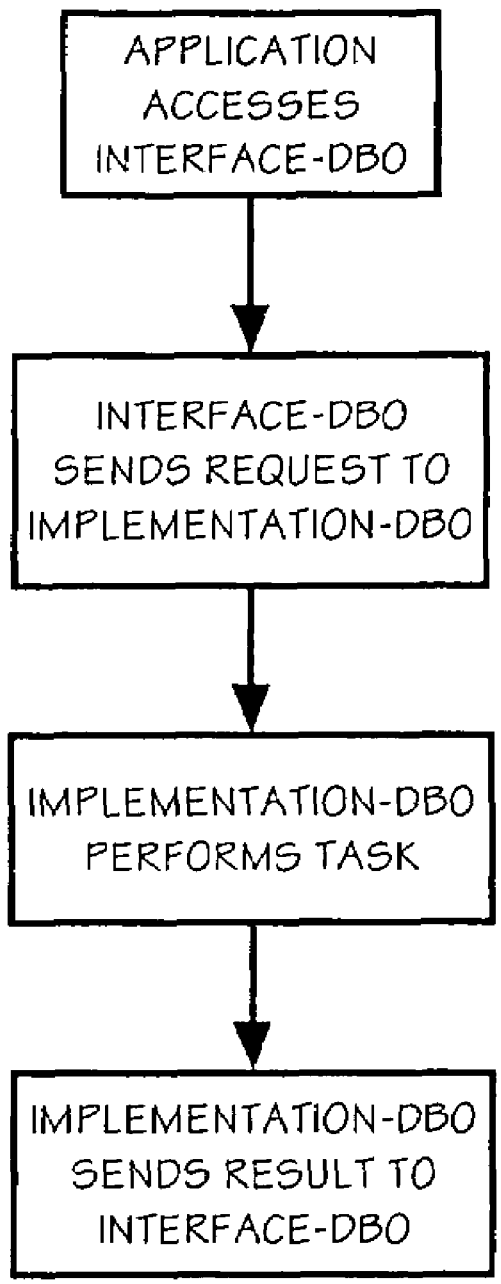
FIG. 5 is a flow diagram illustrating the operation of interface-DBOs and implementation-DBOs for providing architecture features and capabilities within the architecture of the scalable, distributed network of the present invention.

In an exemplary embodiment of the architecture of the present invention when an application, for example, creates a DBO, two DBOs are actually created. These two DBOs are an interface-DBO within the application, and an instance of the real DBO (a/k/a an implementation-DBO). This relationship is best illustrated in FIG. 4. In a preferred embodiment of the invention, each time the application uses the interface-DBO, a message is sent to the implementation-DBO, which carries out the task and returns the result, as shown in FIG. 5. When the application frees the DBO the reverse happens. The implementation-DBO gets a message call to de-allocate its resources and terminate.

In an exemplary embodiment of the present invention the hierarchy of the present invention allows the polymorphic and inheritance features of object oriented programming to be more fully realized. For example, in the present invention polymorphism (which allows a routine in a derived class to be redefined), and inheritance (which allows for the derivation of desired characteristics within a subclass) operate to produce object construction, implementation, and utilization without centralized control, i.e., the object hierarchy of the objects of the present invention manage object construction, implementation, and utilization.

A DBO may be either memory or disk resident. A DBO required for execution is loaded from disk if not present in memory. In a preferred embodiment, DBOs have the following "behavioral" characteristics: (1) capability or feature may be dynamically created, added and changed; (2) other objects including other DBOs may provide a DBO with additional capabilities or features; (3) self checking mechanism with dynamic re-start and re-initialization upon run-time or like failure (4) standardized communication and services interface (e.g., object-to-object, user-to-object, and object-to-user); and (5) fully thread-safe.

The Architecture Administrator

Figure 6A:
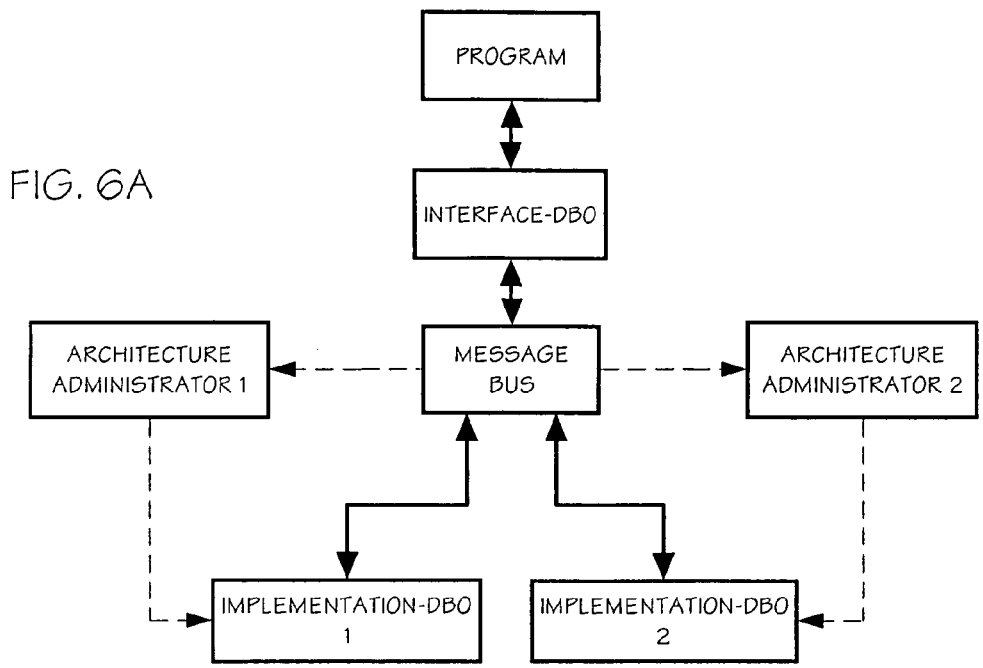
FIG. 6A is a block diagram illustrating architecture administrator (AA) control over the creation and utilization of implementation-DBOs for providing architecture features and capabilities within the architecture of the scalable, distributed network of the present invention.
Figure 6B:
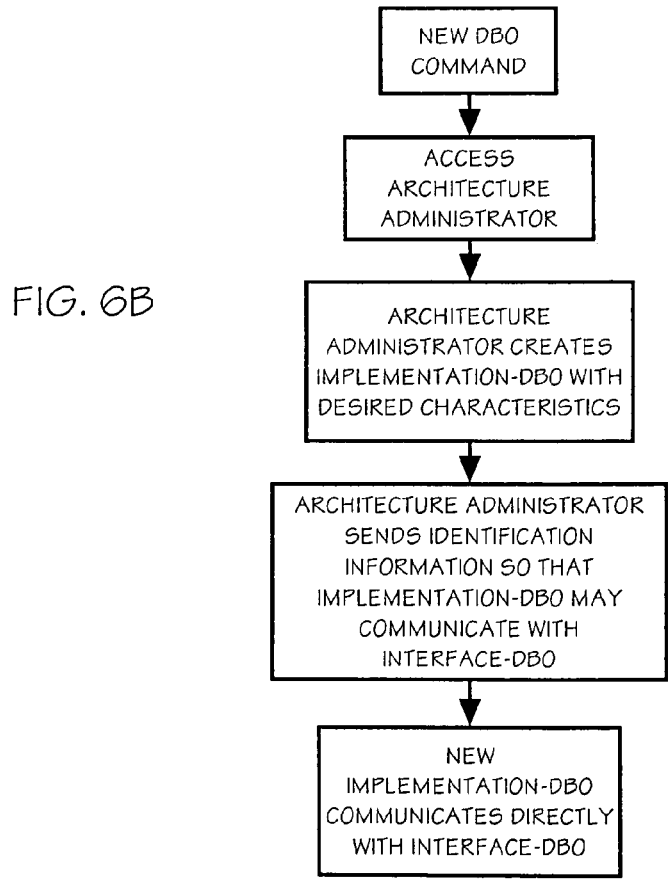
FIG. 6B is a flow diagram illustrating architecture administrator (AA) control over the creation and utilization of implementation-DBOs for providing architecture features and capabilities within the architecture of the scalable, distributed network of the present invention.

In an exemplary embodiment of the architecture of the present invention when an application, for example, creates a DBO, two DBOs are actually created (FIGS. 6A and 6B). These two DBOs are an interface-DBO within the application, and an instance of the real DBO (a/k/a an implementation-DBO). This relationship is best illustrated in FIG. 4. For example the application may create a DBO:

DynamicObject *pDObj = new DynamicObject;

The "new" call issues a message call to the architecture administrator (AA), which creates a new DBO with the desired characteristics. The object (DBO) created by the AA also contains the implementation. The AA then replies with "identification information" to the implementation-DBO, such that the interface-DBO and DBO (implementation-DBO) may communicate (FIGS. 6A and 6B).

Figure 7:
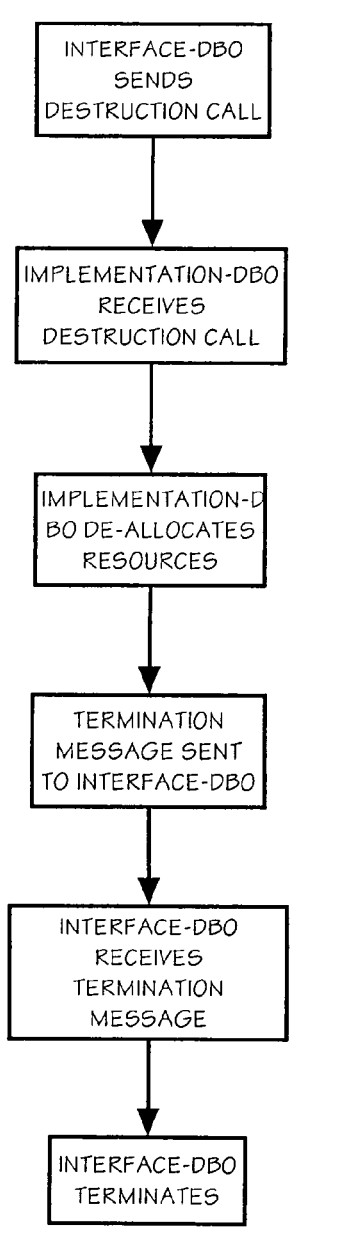
FIG. 7 is a flow diagram illustrating resource reallocation and DBO termination within the architecture of the scalable, distributed network of the present invention.
Figure 8:
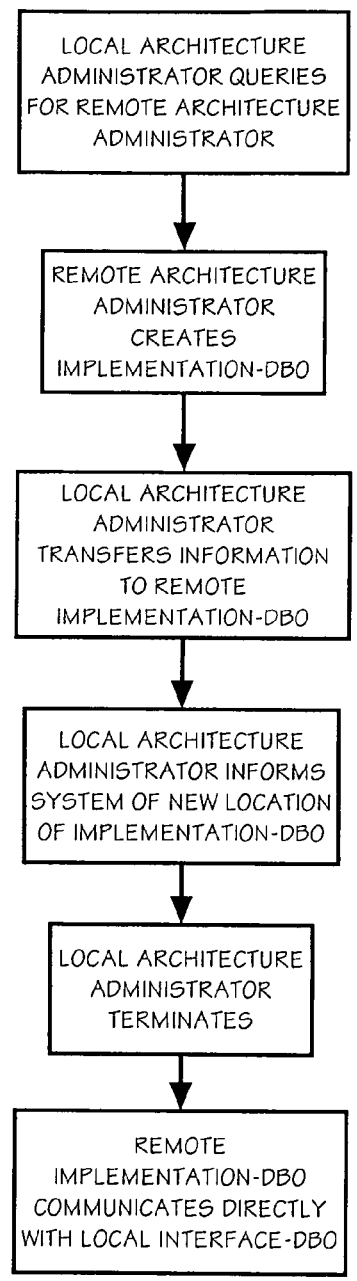
FIG. 8 is a flow diagram illustrating communication between a remote implementation-DBO and a local interface-DBO for providing architecture features and capabilities within the architecture of the scalable, distributed network of the present invention.

In a preferred embodiment of the invention, each time the application uses the interface-DBO, a message is sent to the implementation-DBO, which carries out the task and returns the result. When the application frees the DBO the reverse happens. The implementation-DBO gets a message call to de-allocate its resources and terminate. When the interfaced object (IO) receives the termination reply it can then safely terminate as well (FIG. 7).

Thus, the AA serves as the central "launch point" ("dispatcher") for DBOs. While the AA controls launch of DBOs, it is anticipated in a presently preferred embodiment, it will have no further involvement in DBO transactions. This is important, since to do otherwise introduces a "single-point-of-failure" in the system.

When the AA creates a new DBO it may involve loading a disk-based object. The implementation-DBO will often use resources and application programming interfaces ("APIs") provided by the underlying operating system ("OS"). Such OS resource will often be provided through shared libraries.

This architecture has a number of significant advantages:
1. The application does not embed any knowledge of the DBO; only the interface. This allows DBOs to be updated on "the-fly" such that a DBO may automatically have an application take advantage of the update.
2. The "message bus" can be either interprocess communication ("IPC") within one system or "over the network" for two separate systems (FIG. 8).
3. The application does not need to have direct access to the resources needed to run a particular DBO. This allows for "very thin" network appliances (e.g., where the appliance has little RAM and/or ROM) (FIG. 8).
4. If the DBO is a transaction object, the implementation object may issue another network call to a service provider (e.g., a DBO service provider or DBOSP) with the particulars of the transaction.
5. The AA is involved in creating the implementation object. All further communication happens directly between the interface object and the implementation object (FIGS. 6A and 6B).

DBO Methods

The interface and implementation-DBOs preferably vary in their implementation. Preferably the interface DBO will be implemented as a pure message pass. For example, in a simple function called "ADD" which adds to two integer values and returns the sum:

Interface DynamicObject:
Int DynamicObject: :Add(int a, int b)
{
int sum;
string s1 = Encode (a);
string s2 = Encode (b);
string reply;
send_message (gpid_implementation_object, dynamic-
.dynamicobject.add,
s1+s2, reply);
sum = DecodeInt (reply);
return sum;
}

For the implementation object, its min event loop would receive the message and call a function matching the "dynamic.dynamicobject.add" identifier.
Implementation DynamicObject:
Int implementation_add (string msg, string answer)
{
// Extract values from msg
int a=DecodeInt (msg);
int b=DecodeInt (msg[4]);
int sum = a+b;
answer = Encode (sum);
}

From the applications view, life is significantly simpler. Assuming that the application has a function called "SomeFunction( )", it would proceed as follows to use the DynamicObject based Add method implemented herein before:
Void SomeFunction( )
{
DynamicObject A;
Int sum;
Sum - A.Add (1, 2);
}

While more direct methods of addition are available the example string provided several advantages transparently to the application:
1. The calculation is redirected to be performed outside the application (FIG. 8).
2. The redirection may include a network jump, i.e., the implementation may have been running on a different computer.
3. The implementation is shielded from the application, and as long as the results stay the same, the implementation may be changed, optimized and updated without application concern.

DBO Examples

Figure 9:
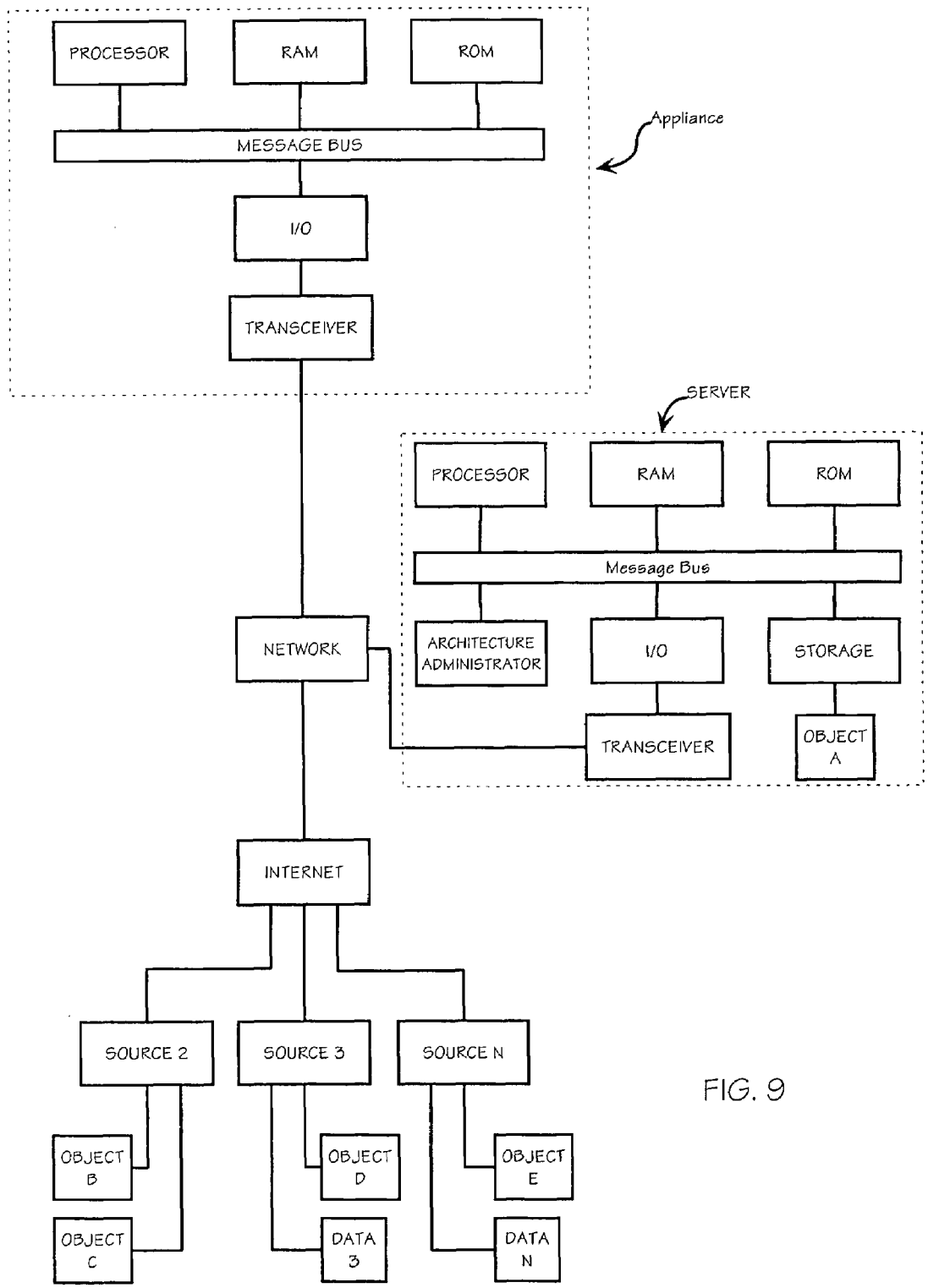
FIG. 9 is a block diagram illustrating scalable resource sharing between, for example, a "thin" information appliance within the architecture of the scalable, distributed network of the present invention.

The following examples are provided to those of ordinary skill to further illustrate the power and adaptability of the architecture of the present invention:
1. We want to log onto a network. The logon object encrypts our password, negotiates with the server and finally authenticates our account. It returns with an "OK" signal, that we're now ready to use network resources.
2. We want to watch a pay-per-view movie. The LogOn object works as in 1, the Billing and Logging objects connects and notifies the content provider (e.g., cable, theater, or movie company) we have an account.
3. We want to surf the network with our PDA. We load a browser object. Since we only have 1 MB of RAM on our system, the browser object connects to the Netscape browser already running on our PC. Through the transparent networking capabilities of the DBO it seems to us as if the browser is running on the PDA even though its really running on the PC (FIG. 9). This may allow the storage of account, billing, registration information, and the like seamlessly across the network.

Transparent Relocation of DBOs

The interface-DBO serves only as an interface; it contains no state information. Whereas an implementation-DBO contains all state and execution information. Thus, all execution and state information is localized. This total encapsulation allows relocating the execution of a DBO to another system.

Figure 10:
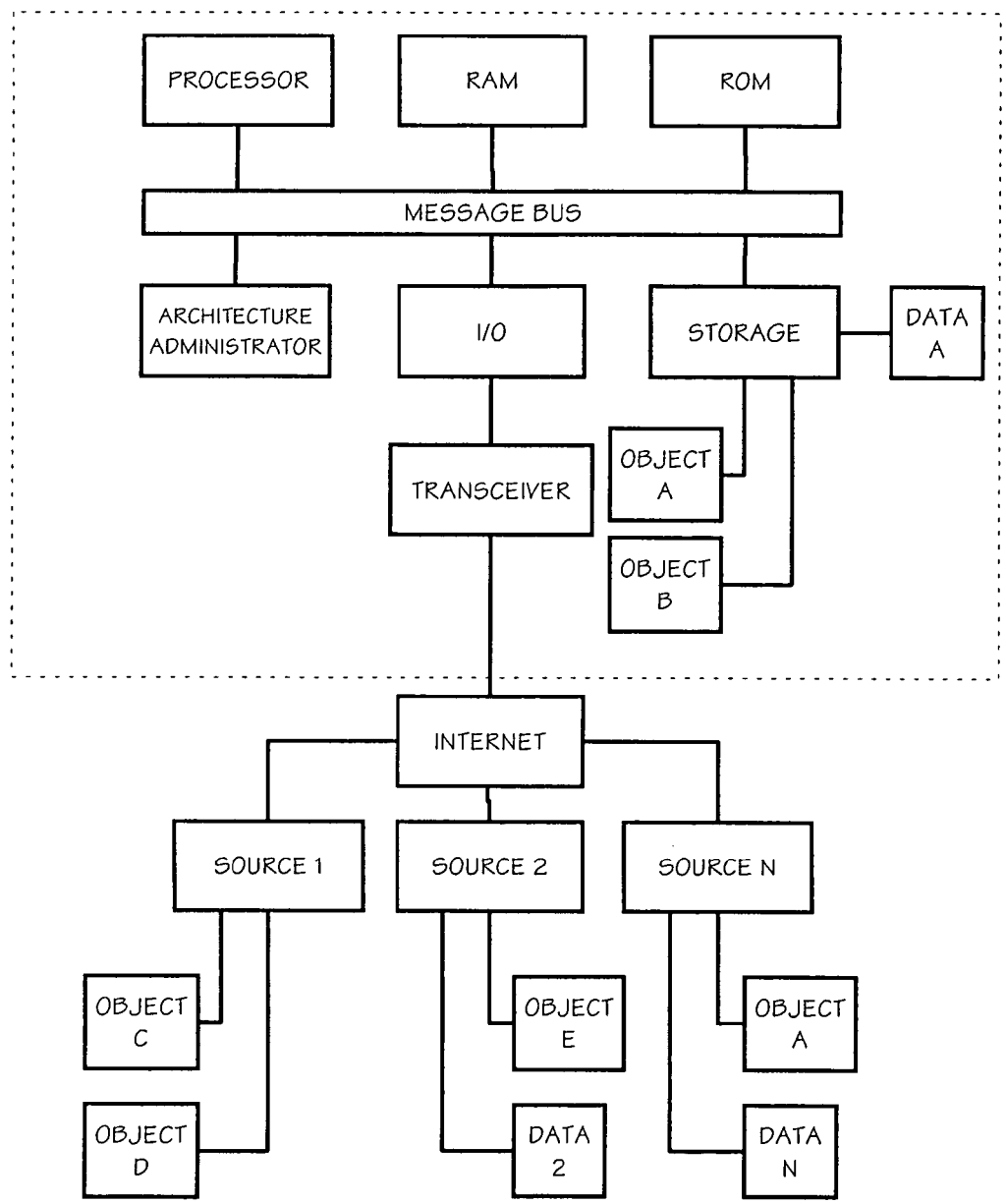
FIG. 10 is a block diagram illustrating scalable resource sharing between, for example, an information appliance within the architecture of the scalable, distributed network of the present invention.

In an exemplary embodiment of the architecture of the invention a local AA may request a remote AA (i.e. running on a different computer) to create an instance of the implementation object, transfer the state and execution information to the remote system, inform the interface of the next server, and terminate itself. Thus, the interface object is not necessarily connected to an implementation object running on a different computer (FIG. 10).

Business Process Features (Transaction Control)

The following novel business process features may be operated using the environment described herein and in particular using the exemplary object based environment.

Transaction Control

The architecture of the present invention facilitates flexible definition, control, and tracking of transactions via a shared transaction infrastructure. Thus, the architecture allows content and resource providers to furnish content and resources in a form which protects the provider's property interests in its content or resources. Billing of users of content and resources would be centralized. Preferably, distribution of payment for the provided content or services may be transparent to the user at the time the content is provided thereby increasing efficiency of the transaction. In this manner, increased content and resources may be provided to the user at lowered transaction costs.

Figure 11:
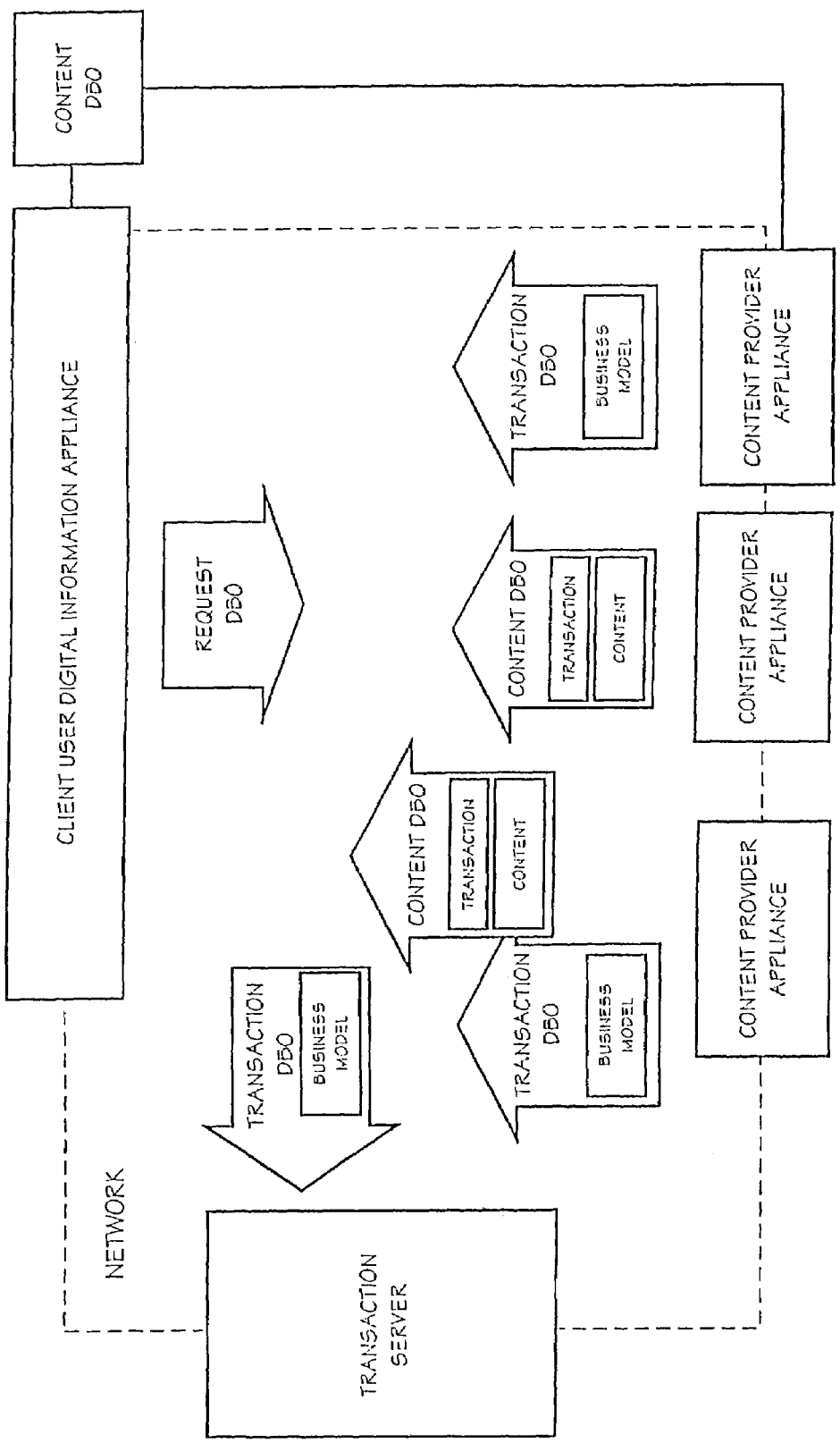
FIG. 11 is a block diagram illustrating transaction control and facilitation within the architecture of the scalable distributed network of the present invention.

Referring now to FIG. 11, a block diagram is shown illustrating transaction control and facilitation within the architecture of the present invention. Content and/or resources [hereinafter content] provided by content/resource providers is encapsulated by Dynamic Based Objects (DBOs) of the present invention. Such Content DBOs may, in addition to the encapsulated content, provide transaction information dynamic based objects (Transaction DBOs) containing transaction information such as billing information and/or security and encryption information. This transaction information, which may be encapsulated in the Content DBO, allows the Content DBO to control use of its encapsulated content in any way that the content/resource provider has allowed (i.e., in any way the content/resource provider has decided to encapsulate the content). In this manner, control of the content may be accomplished without further oversight by the content/resource provider allowing property interests in the content to be protected in an efficient manner. For instance, the provider of content containing protected intellectual property (e.g., copyrighted, trademarked, or patented material) may encapsulate the content in a Content DBO and define transaction and use limits for the information. The content may then be placed onto a network such as the Internet where it may be efficiently accessed by potential users while remaining protected from unauthorized copying or use.

In accordance with a first aspect of the exemplary embodiment of the invention shown in FIG. 11, a digital information appliance may require content or resources to preform a task or function requested by a user. The appliance may thus initiate a request for content or resources over the network. This request is accomplished by initiating a Request DBO onto the network. Preferably, the Request DBO contains methods and information necessary to identify, select, and initiate communication with a Content DBO provided by a content/resource provider. Where necessary, the Request DBO may request and use the capabilities of one or more other DBOs to identify, select, and/or initiate communication with Content DBOs. Preferably, the transaction information encapsulated in the Content or Transaction DBOs may be provided to the appliance so that the user may determine the cost of obtaining the content or resources, the type and packaging of content/resources provided, and the like, if desired. However, distribution of payment for the provided content or services may be transparent to the user at the time the content is provided increasing efficiency of the transaction. In this manner, increased content and resources may be provided to the user at lowered transaction costs.

As can be seen from FIG. 11, multiple content/resource providers may have the capability of providing content or resources of the type requested by the appliance. Preferably, the Request DBO is capable of negotiating among these Content DBOs to select the Content DBO which best fulfills the content/resource requirements of the Appliance and the user. The Request DBO may for example select the Content DBO that provides the content required by the Appliance wherein the content is capable of being packaged in the manner required by the Appliance for use, and is provided in the most cost efficient manner in terms of overall cost, pricing structure, and the like. This combination of content/resource packaging and pricing structure is preferably defined by the business model employed by the content/resource provider, and may be furnished by the Content DBO as part of the transaction information. Once the Request DBO selects a Content DBO, the Request DBO, the Content DBO, other DBOs launched by the Appliance, the content/resource provider, or a third party, or a combination of these DBOs may initiate transfer of content or resources to the Appliance. This transfer and use of content or resources by the Appliance may require that the Content DBO request and use capabilities of one or more other DBOs.

Alternately, in accordance with a second aspect of the exemplary embodiment shown in FIG. 11, the digital information appliance may attempt to utilize content or resources encapsulated by a Content DBO already available to the appliance. For instance, the Content DBO, and its encapsulated content, may be stored in a storage medium (e.g., a memory device, an optical storage media such as a DVD/DIVX, a magnetic storage media, and the like) accessible by the appliance. The appliance may require content use information such as transaction information and/or security and encryption information to facilitate use of the content. Similarly, the digital information appliance may receive and utilize content provided by a Content DBO within the limits allowed by the content provider (via the encapsulated transaction information). The Content DBO may limit further use of the content until additional content use information is received from the content/resource provider. In either situation, the appliance may initiate a request for transaction information over the network via a Request DBO. The Request DBO identifies, selects, and initiates communication with a Transaction DBO provided by the content/resource provider. Where necessary, the Request DBO may request and use the capabilities of one or more other DBOs to identify, select, and/or initiate communication with the Transaction DBO.

1. Automatic Micro-Billing of Events and Instances

The architecture of the present invention facilitates automatic micro-billing of transactions for which billing would not have been feasible using prior architectures. Thus, business models which previously would not have been profitable may be implemented allowing provision of an increased variety of content to the user. For instance, a user may be billed for content in small increments of time (e.g., per second, per minute, and the like) or amount (e.g., per byte of information, per page, and the like), or the user may be billed for content of inherently small individual value (e.g., a JPEG worth only a few cents). Conversely, a user may be billed for content in large increments of time or content if desired. Further, it is anticipated that a large portion of content will continue to be provided free of charge to users.

As shown in FIG. 11, the architecture of the present invention utilizes a flexible appliance transaction engine to facilitate billing (and crediting) of client users for content received. Preferably, appliance transaction engines may be embedded in the client user's digital information appliance, content provider appliances, the transaction server, or distributed over the network among these appliances. When content is transferred between appliances, transaction information encapsulated in the Content DBO, or, alternately an associated Transaction DBO is passed to the transaction engine. The transaction engine accumulates this transaction information and periodically directs it to the transaction server where it is utilized for purposes such as debiting and/or crediting user and provider accounts for payment of content provided or received. The transaction engine could, for example, track one or more counters for a particular class of transaction (e.g., video, music, games, information, and the like). The transaction engine would then periodically pass the status of these counters to the transaction server along with the identification of the user, the appliance, the content, and the provider or providers. Exemplary counters could include time, content amount, number of times content is accessed, and the like. The transaction server would then debit the client user's account and credit providers of the content for the content received. Preferably, client users and content providers could access account summaries upon request to view summaries of transactions, account balances, and the like. Such account information could be stored by the server or the client user or provider appliances.

The transaction server may also share revenue from the transaction among the various content providers. For example, transaction information encapsulated in the Content or Transaction DBOs could include provider identification. Such provider identification would be accumulated by the transaction engine and passed to the transaction server. The transaction server would then distribute revenue debited from the user's account accordingly. Similarly, the user's account could be credited for transactions benefiting the provider (e.g., promotional uses of content, providing survey information, and the like). Preferably, this distribution of revenue among providers would normally be transparent to client users of the content. The client user would normally be provided cost structures for receiving the content. However, in a preferred embodiment, client users could also be provided detailed revenue distribution information upon request.

2. Dynamic Support for Multiple Simultaneous Payment Algorithms

Figure 12:
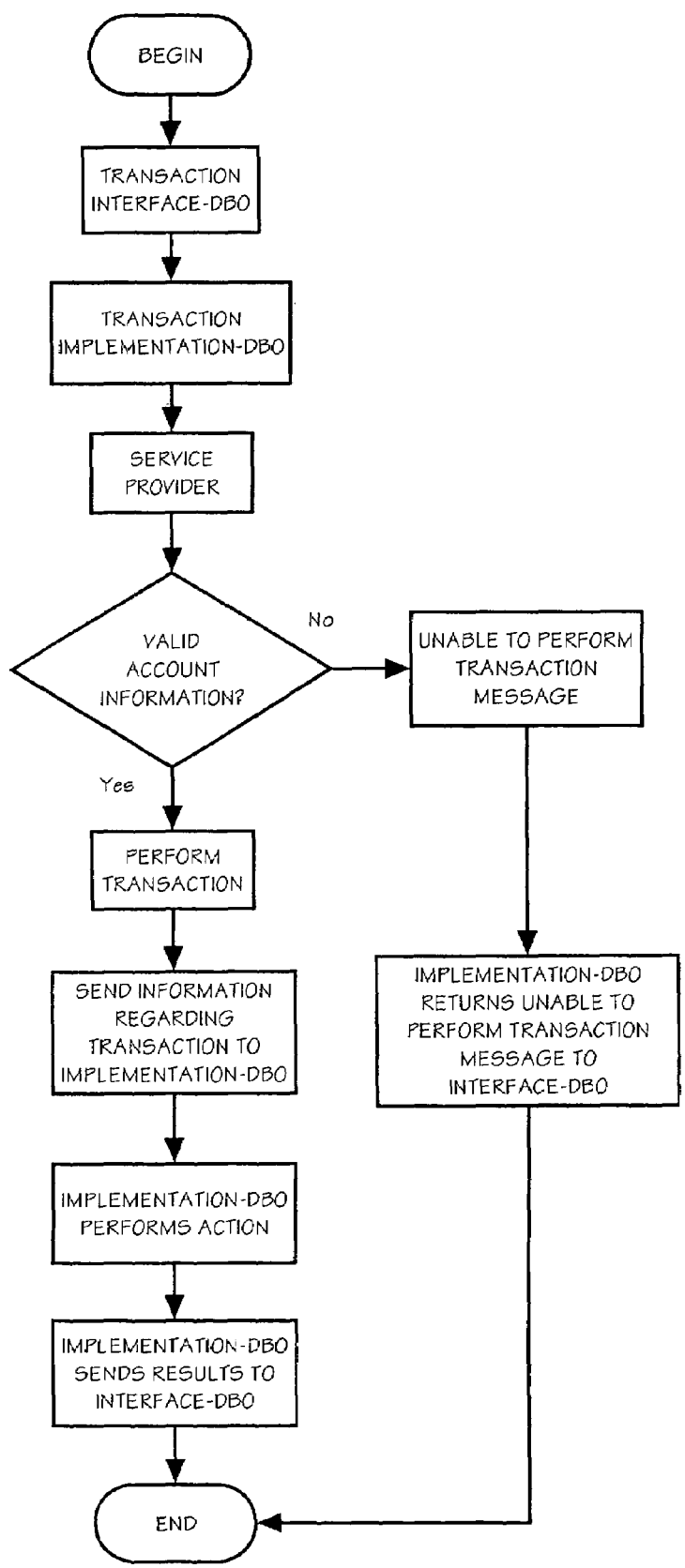
FIG. 12 is a flow diagram illustrating transaction control and facilitation within the architecture of the scalable, distributed network of the present invention.

As shown in FIGS. 11 and 12, the architecture of the present invention is flexible in that it allows providers to employ multiple business models when providing content, and to rapidly switch from one business model to another in a manner that is invisible to the user. A provider's business model is the method used by that provider to provide content to users and to bill those users for receipt and/or use of the content. Prior art systems were limited in that they forced providers to choose one or a limited number of business models. Often providers were forced to invest heavily in developing a particular business model for distribution of content. If users did not accept this business model this extensive investment was lost. Further, development of an alternative business model was often impossible since the time and expense involved was prohibitive.

The present architecture allows the provider's business model to be encapsulated by the Content and/or Transaction Implementation DBOs which are polymorphic. Thus, the business model may be redefined by the provider easily and inexpensively. Further, the architecture of the present invention allows providers to employ multiple business models when providing content by embedding different business models in Content DBOs. For example, the provider could alter the billing structure for the content. Thus, a provider of video content, could for example, bill a client user a single charge for unlimited use of video content, a single charge each time the video content is played, or incrementally by time or amount of video content played. Further, the provider could alter the way in which the content was packaged, e.g., the entire video could be packaged as a single unit, or clips of the video could be packaged individually. The provider may offer each of these alternatives to the user for his or her selection. Thus, if a user wished to view only a specific clip of a video, he or she could choose to be billed per amount of content provided or time spent viewing that content.

Encapsulation of the business model also allows the provider to rapidly switch from one business model to another in a manner that is invisible to the user. Thus, a provider may rapidly abandon one business model, which is not accepted by users, in favor of an alternative business model which may be more readily accepted. Similarly, providers may alternate between business models to, for example, take advantage of cyclical demand for their content, run "sales" of their content, or the like.

3. Automatic Offline/Online Transactions with Deferred Connections

Figure 13:
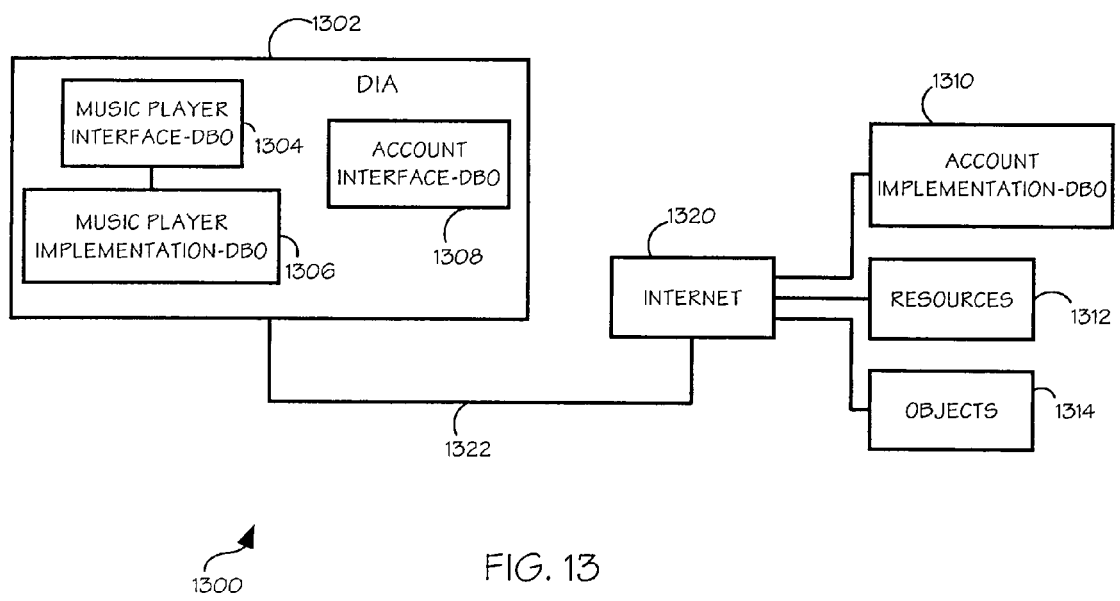
FIG. 13 is a block diagram illustrating offline/online transactions having deferred connections of the architecture of the scalable, distributed network of the present invention.

Referring now to FIG. 13, an exemplary embodiment of the present invention is shown wherein system 1300 including a digital information appliance 1302 may be utilized to play music. The digital information appliance 1302 includes a music interface-DBO 1304 that may utilize different music implementation-DBO's. The digital information appliance 1302 may also include an account interface-DBO 1308 so that the digital information appliance 1302 may purchase different music implementation-DBOs or other resources 1312 over the INTERNET 1320. The account interface-DBO 1308 may access the account implementation-DBO 1310 for the purchase of objects 1314 and resources 1312 such as other music implementation DBOs and the like. During the usage of the digital information appliance 1302, it may be preferable to download resources 1312 over the INTERNET 1320 for utilization on the digital information appliance 1302. However, these resources may be encoded so that they may be utilized a limited amount of times. Once this usage has been exhausted, it may be preferable to continue usage and defer billing of the usage until the digital information appliance has access to the account implementation-DBO. For example, if the digital information appliance was configured as a music-playing device that may be utilized for remote operation, the digital information appliance may download music implementation-DBO over the INTERNET 1320. However, this connection 1322 may not be available at all times, such as when the digital information appliance is utilized at a remote location. In this instance, the digital information appliance may contain an account interface-DBO to monitor usage of the music implementation-DBO 1306 so that the account information may be updated later when the digital information appliance 1302 has access to the account implementation-DBO 1310. In this way, the digital information appliance 1302 may automatically perform offline and online transactions by utilizing a deferred connection.

Figure 14:
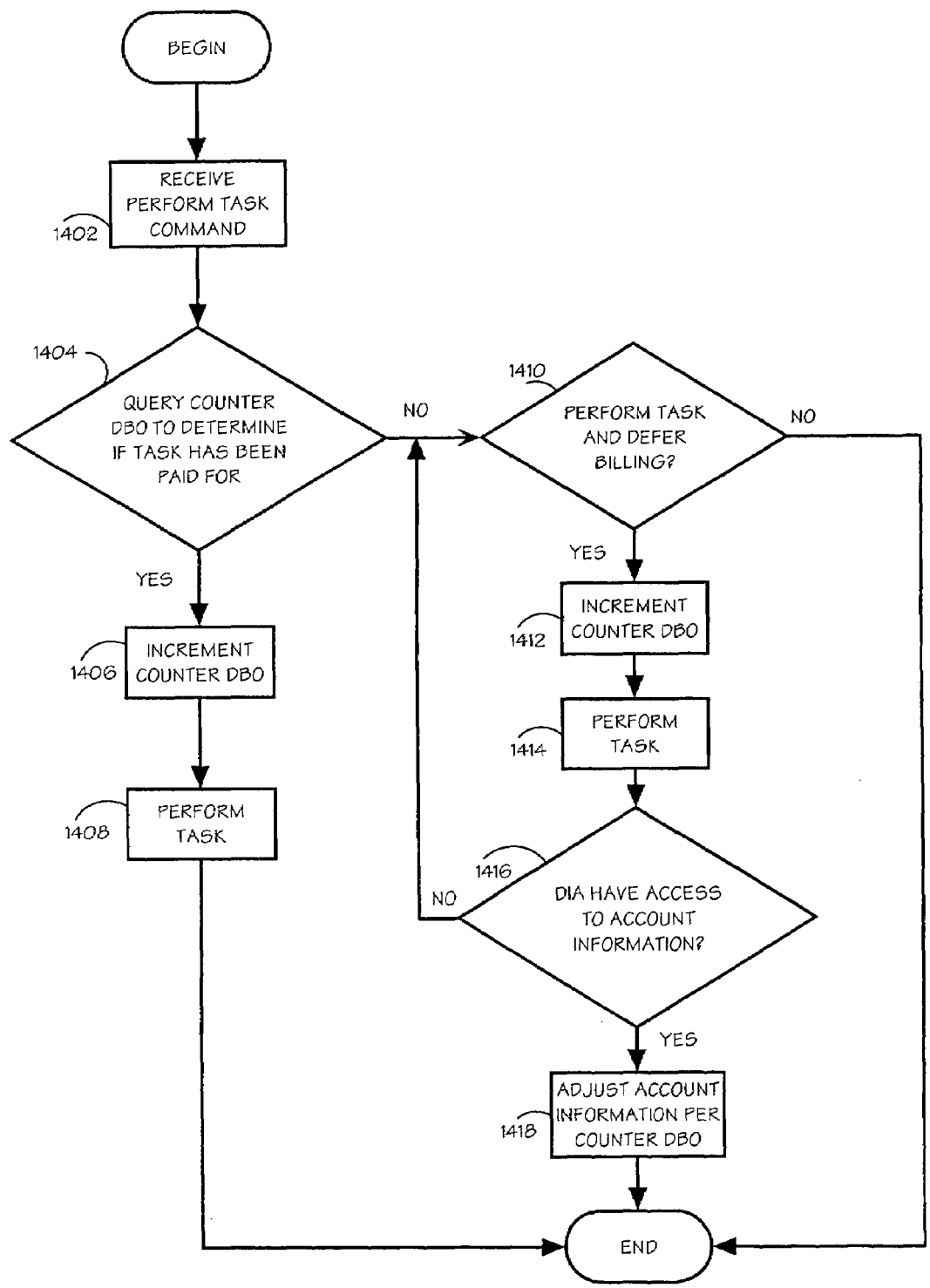
FIG. 14 is a flow diagram illustrating the operation of FIG. 13 within the architecture of the scalable, distributed network of the present invention.

Referring now to FIG. 14, an exemplary method is shown wherein a digital information appliance 1302 (FIG. 13) may automatically perform offline and online transactions with deferred connections. A digital information appliance may receive a command to perform a task 1402 stored in the digital information appliance. In this instance, the task is a billable task, so the account interface-DBO must be queried to determine if the task has been purchased 1404. If the task has been purchased, the account-interface DBO may be updated 1406 thereby permitting the task to be performed 1408. However, upon querying the account interface-DBO, it may be determined that the task has not been purchased. In this instance, it may be desirable to permit the task to be performed and defer the billing until later 1410. If that is desired, the account interface-DBO may be updated, such as by incrementing a counter 1412, to show that the task is being performed on credit, thereby allowing the digital information appliance to perform the task 1414. Once a digital information appliance 1302 has a connection to the INTERNET 1320 so that the account interface-DBO 1416 has access to the account implementation-DBO 1310 (FIG. 13), the digital information appliance may adjust the account information per the account interface-DBO 1418. It may be preferable to limit the amount of times this deferred billing may be performed so as to secure payment of the performed tasks. For instance, a user who utilized a task to the point where the total charges exceed the value of the digital information appliance would have little incentive to connect the digital information appliance to the INTERNET so the user may be charged for that past, deferred billing. By limiting the amount of usage that may be credited on a digital information appliance, the user may then have incentive to reutilize the digital information appliance, thereby giving the digital information appliance access to the account implementation-DBO allowing the user to be billed.

Figure 15:
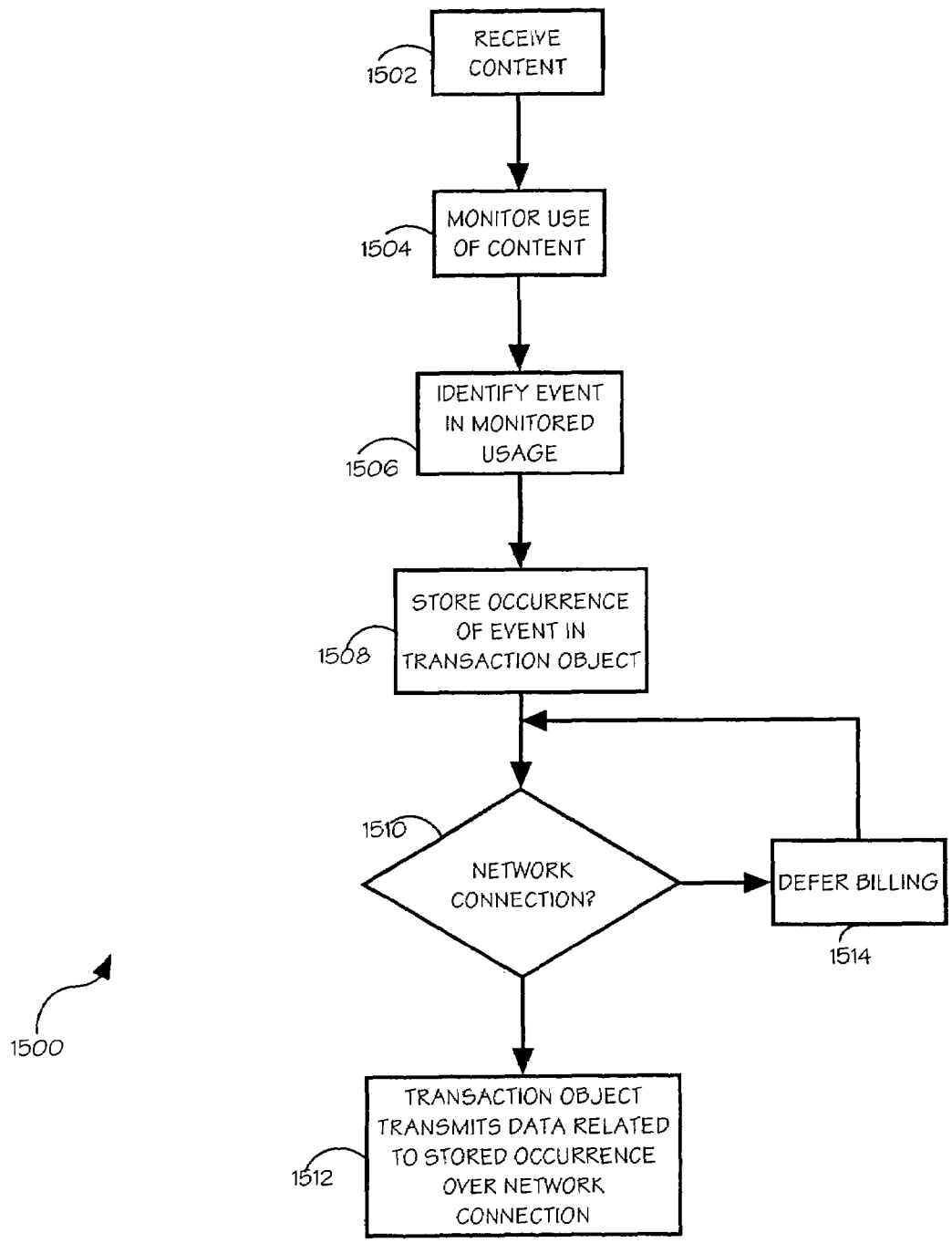
FIG. 15 is a flow diagram depicting an exemplary embodiment of the present invention wherein transaction control utilizing objects is shown.

Referring now to FIG. 15, an additional exemplary method 1500 of transaction control in a network environment is shown. A user, utilizing a digital information appliance or the like, may receive content 1502. Content may be received over a network, or stored on media, such as a compact disc read-only memory (CD-ROM), digital video disc (DVD), floppy disk, removable memory device, PC card, and the like. The user's digital information appliance may monitor the use of the content 1504 and identify an event in the monitored usage 1506. An event may include any number of actions, manipulation, and display of the content. Thus, a provider of content may provide a variety of payment algorithms, including usage monitoring methods, to track user interaction. An occurrence of the event may be stored in a transaction object 1508 embedded in the content. If a network connection is available 1510, the transaction object may transmit data related to the stored occurrence over the network connection 1512. However, if a network connection is not available 1510, transmittal of the data may be deferred 1514. It may be desirable to utilize a transaction object formatted as a dynamic base object to enable the transmittal of billing information seamlessly over the network.

Thus, there has been described an object driven software architecture and several process features which together provide for at least all of the advantages stated herein. Although the invention has been described with a certain degree of particularity, it should be recognized that elements thereof may be altered by persons skilled in the art without departing from the spirit and scope of the invention. It is believed that the transaction control system of the present invention and many of its attendant advantages will be understood by the forgoing description, and it will be apparent that various changes may be made in the form, construction and arrangement of the components thereof without departing from the scope and spirit of the invention or without sacrificing all of its material advantages, the form herein before described being merely an explanatory embodiment thereof. It is the intention of the following claims to encompass and include such changes.

What is claimed is:

1. A digital information appliance-implemented method for performing a transaction in a network environment, comprising:

requesting content over a network connection, the request being made utilizing a request object that comprises a request dynamic base object which includes a request interface dynamic base object and a request implementation dynamic base object;

receiving the content on a first digital information appliance, said content including being in conjunction with an encapsulated transaction object;

monitoring usage of the content;

identifying a utilization event of the monitored usage; and storing an occurrence of the utilization event in the transaction object;

wherein the content and transaction information are encapsulated in the transaction object;

wherein the transaction object is capable of transmitting data related to the stored occurrence of the utilization event over a network via a direct, object-to-object communications protocol; and wherein the request is made to the request interface dynamic base object, the request interface dynamic base object passing the request to a request implementation dynamic base object, the request implementation dynamic base object capable of negotiating among a plurality of content objects a desired content object based upon a user-defined criterion that includes at least one of cost, pricing structure and compatibility of the content object with the digital information appliance.

2. The method as described in claim 1, wherein the user-defined criterion includes at least one of cost, pricing structure and compatibility of the content object with the digital information appliance and the plurality of content objects reside on a plurality of digital information appliances, the plurality of digital information appliances accessible to the first digital information appliance over the network.

3. The method as described in claim 1, wherein the network connection is not available, saving the occurrence of the utilization event until the network connection is available, at which time data related to the stored occurrence of the utilization event is transmitted.

4. The method as described in claim 1, wherein the transaction object includes a first occurrence of the transaction object including a transaction interface dynamic base object and a second occurrence of the transaction object including a transaction implementation dynamic base object.

5. The method as described in claim 4, wherein the transaction implementation dynamic base object is capable of supporting a plurality of payment algorithms, the payment algorithms capable of being modified without modifying the transaction interface dynamic base object.

6. The method as described in claim 4, wherein the first occurrence of the transaction object transmits data related to the stored occurrence of the utilization event to the second occurrence of the transaction object, the second occurrence of the transaction object residing on a second digital information appliance.

7. The method as described in claim 6, wherein the second digital information appliance is a central transaction authenticator, the central transaction authenticator capable of storing and updating user account information.

8. The method as described in claim 1, wherein the content is provided by at least one of media and network connection.

9. The method as described in claim 1, wherein the transaction information includes billing information and security information.

10. The method as described in claim 1, wherein the transaction object received at the first digital information appliance in conjunction with said content is capable of transmitting said data related to the stored occurrence of the utilization event over the network via the direct, object-to-object communications protocol.

11. A digital information appliance system for performing a transaction in a network environment, comprising:
- a processor for executing a program of instructions on a digital information appliance;
- a network connection device coupled to the processor for connecting the digital information appliance to a network; and
- a memory coupled to the processor for storing the program of instructions, wherein the program of instructions configures the digital information appliance to:
- request content over the network, the request being made utilizing a request object that comprises a request dynamic base object which includes a request interface dynamic base object and a request implementation dynamic base object;
- receive content on the digital information appliance, said content including being in conjunction with an encapsulated transaction object;
- monitor usage of the content;
- identify a utilization event of the monitored usage; and
- store an occurrence of the utilization event in the transaction object;
- wherein the content and transaction information are encapsulated in the transaction object;
- wherein the transaction object is capable of transmitting data related to the stored occurrence of the utilization event over a network via a direct, object-to-object communications protocol;
- wherein the request is made to the request interface dynamic base object, the request interface dynamic base object passing the request to a request implementation dynamic base object, the request implementation dynamic base object capable of negotiating among a plurality of content objects a desired content object based upon a user-defined criterion that includes at least one of cost, pricing structure and compatibility of the content object with the digital information appliance.

12. The digital information appliance system as described in claim 11, wherein the user-defined criterion includes at least one of cost, pricing structure and compatibility of the content object with the digital information appliance and the plurality of content objects reside on a plurality of digital information appliances, the plurality of digital information appliances accessible to the first digital information appliance over the network.

13. The digital information appliance system as described in claim 11, wherein the network connection is not available, saving the occurrence of the utilization event until the network connection is available, at which time data related to the stored occurrence of the utilization event is transmitted.

14. The digital information appliance system as described in claim 11, wherein the transaction object includes a first occurrence of the transaction object including a transaction interface dynamic base object and a second occurrence of the transaction object including a transaction implementation dynamic base object.

15. The digital information appliance system as described in claim 14, wherein the transaction implementation dynamic base object is capable of supporting a plurality of payment algorithms, the payment algorithms capable of being modified without modifying the transaction interface dynamic base object.

16. The digital information appliance system as described in claim 14, wherein the first occurrence of the transaction object transmits data related to the stored occurrence of the utilization event to the second occurrence of the transaction object, the second occurrence of the transaction object residing on a second digital information appliance.

17. The digital information appliance system as described in claim 16, wherein the second digital information appliance is a central transaction authenticator, the central transaction authenticator capable of storing and updating user account information.

18. The digital information appliance system as described in claim 11, wherein the content is provided by at least one of media and network connection.

19. The digital information appliance system as described in claim 11, wherein the transaction information includes billing information and security information.

20. The digital information appliance system as described in claim 11, wherein the transaction object received at the digital information appliance in conjunction with said content is capable of transmitting said data related to the stored occurrence of the utilization event over a network via the direct, object-to-object communications protocol.

* * * * *